(No Model.) 2 Sheets—Sheet 1.
J. A. CHRISTY.
MODE OF ADVERTISING.
No. 405,532. Patented June 18, 1889.
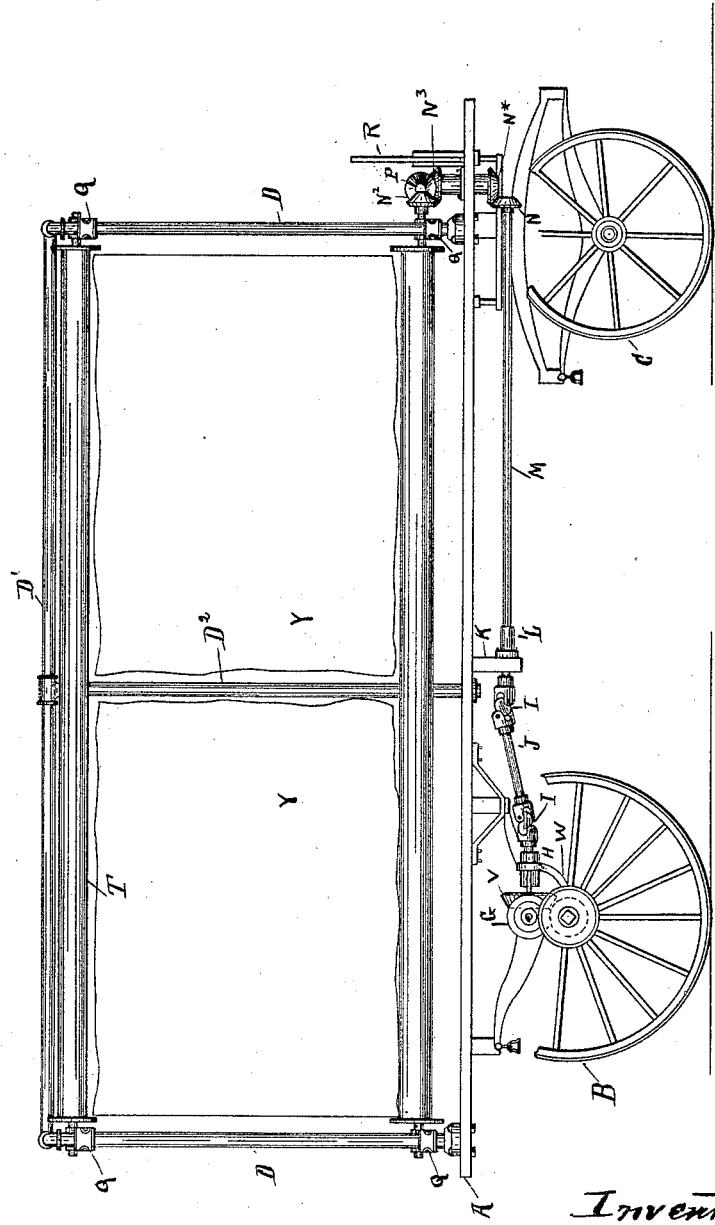
Fig. I.
Witnesses:—
Inventor:—
J. A. Christy
By Atty (No Model.) 2 Sheets—Sheet 2.

J. A. CHRISTY.
MODE OF ADVERTISING.

No. 405,532. Patented June 18, 1889.

United States Patent Office.

JAMES ANDREW CHRISTY, OF LOS ANGELES, ASSIGNOR TO JAMES W. MOYLE, OF SAN FRANCISCO, CALIFORNIA.

MODE OF ADVERTISING.

SPECIFICATION forming part of Letters Patent No. 405,532, dated June 18, 1889.

Application filed February 12, 1889. Serial No. 299,683. (No model.)

*To all whom it may concern:*

Be it known that I, JAMES ANDREW CHRISTY, a citizen of the United States, residing at Los Angeles, in the county of Los Angeles and State of California, have invented certain new and useful Improvements in Advertising Mediums; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to devices for advertising upon the street and elsewhere, and has for its object the provision of a chariot with a moving or panoramic advertising-scroll which is operated by the movements of the vehicle.

The invention consists in the construction and combination of parts hereinafter described, and pointed out in the claims.

The accompanying drawings illustrate what I consider the best means for carrying out the invention.

Figure 4:
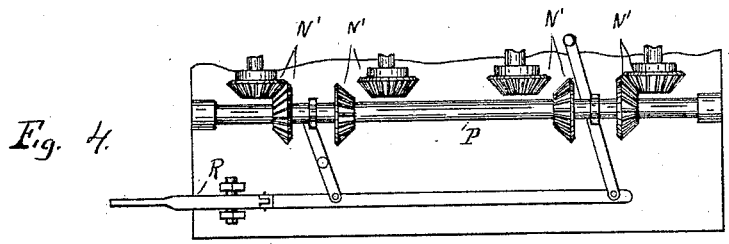
Figure 3:
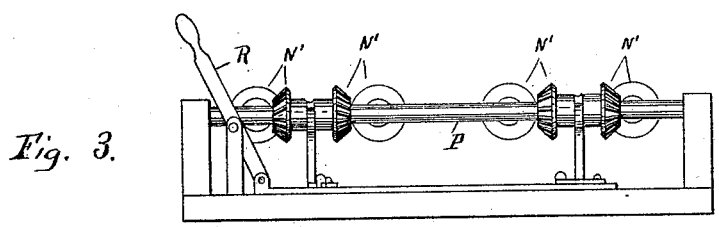
Figure 2:
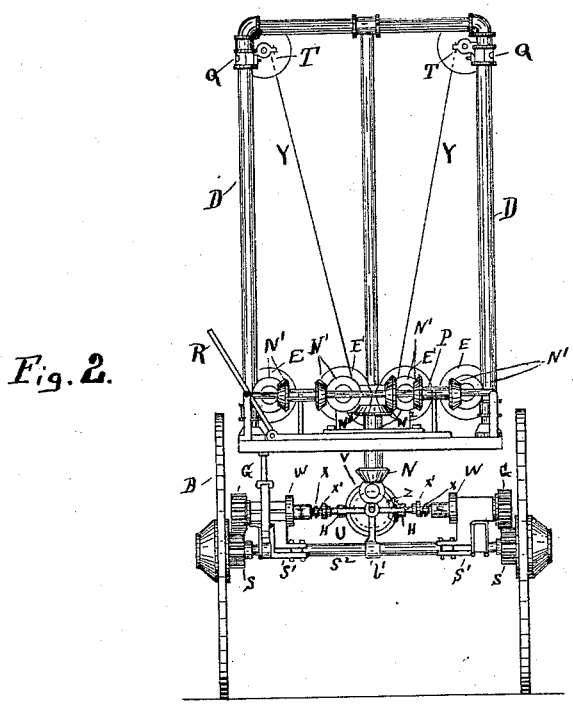

Figure 1 is a side elevation of the device. Fig. 2 is a front elevation of the same with the front wheels and axle removed. Figs. 3 and 4 are detail views.

Similar letters of reference indicate corresponding parts in all the figures where they occur.

A is the platform of a vehicle, and B the rear and C the front wheels of the same. The hubs of the rear wheels bear the gears S S inside of the spokes, and the rear axle bears brackets S' S', which support a shaft U directly above and parallel with the axles $S^2$. Gears G G, meshing with gears S S, are placed loosely upon shaft U, and are caused to turn the same by the engagement of clutches W W, one portion of which is formed integral with or attached to gears S S, while the other portion is splined upon the shaft U and pressed into engagement with the gear portions by springs X X, which surround shaft U. The clutch members are formed with beveled teeth, so that when the vehicle is moving forward the teeth will engage, while when the vehicle is backed the teeth will slip over each other, and gears G G will be turned without turning shaft U. The portion of the clutch against which spring X abuts can be withdrawn from engagement with the other portion by any suitable means when the wheel on one end of the axle is revolved faster than that on the other. The inner ends of the springs abut against collars X' X', pinned to shaft U.

Shaft U has a bevel-gear Z fixed upon it, which meshes in a bevel-gear V, which is supported by a yoke H, which loosely encompasses the shaft U and is supported by a bracket U' from the rear axle. Attached to gear V is a universal-coupling I I, which connects with an angle-shaft J, which in turn is coupled to the longitudinal shaft M, supported in hangers K, having bearings L, and extending to the forward end of the vehicle, where it is provided with a gear N, which gears with pinion $N^*$ on the lower end of a short vertical shaft or stud O, having bearings in the platform of the vehicle.

Upon the upper end of shaft O is provided a gear $N^3$, which engages a gear $N^2$ on a transverse shaft P, whose function will presently be explained.

Upon the platform A of the vehicle are secured corner-posts D D, suitably connected at top, and supporting-bearings Q Q for rollers over which the advertising-scroll is drawn. The upper rollers (marked T T) are idlers, and have no mechanical connection with the moving parts of the vehicle except by the canvas or scroll itself. Two bottom or lower rollers are provided on each side, the exterior roll of each pair being marked E and the interior E'. Y is the endless canvas, which is provided on each side of the chariot and runs over rolls E, T, and E' on each side. To turn the rolls E or E', I provide upon shaft P two pairs of gears N', connected by collar and feathered upon the shaft, which can be made to engage either gears borne on ends of rolls E or those on ends of rolls E' by shipping the pairs of gears N'. This shipping is effected by means of the operating-lever R and suitable connecting-levers, as shown.

Now it will be readily understood how the progression of the vehicle will operate first shaft U, shaft J M, short shaft O, and either the rolls E or E', according to the desire of operator. When rolls E are turned, the canvas will be drawn in one direction, and when rolls E' are turned it will move in the opposite direction. It will also be seen that by virtue of clutches W W the vehicle may be backed without disturbing the canvas, and also that when one wheel goes faster than the other the clutch on the faster-revolving wheel can be disengaged.

It will be seen that the canvas only intervenes between the eye and the interior of the wagon, so that an artificial light may be used inside the vehicle to show up the matter on the screens or canvas. I may also provide suitable bells, gongs, or any desired musical instrument to attract attention to the wagon.

A longitudinal rod D' may be employed to connect the cross portions of the parts D, and this rod may be centrally supported by a standard $D^2$.

Having thus described my invention, what I claim, and desire to secure by Letters Patent, is—

1. The combination of a running-gear, a frame mounted thereon, apron-carrying rolls mounted at bottom and top of the frame, gears at the front end of the bottom rolls, a shaft geared thereto and extending to the rear axle, a transverse shaft over said axle carrying center gears to which the longitudinal shaft is geared, gears at the ends of said transverse shaft and gears on the rear hubs of the running-gear, and clutches on the transverse shaft between the end gears and the center gears to cause the engagement and disengagement of the center gears, as described.

2. The combination of a running-gear, a frame mounted thereon, a transverse shaft on the forward end of said frame carrying movable bevel-gears, and a shipper for operating said gears, two pairs of rolls mounted in the frame and having bevel-gears on their forward ends, the movable gears being adapted to engage alternately one or the other of each pair of bottom rolls, idler-rolls at the top of the frame, and traveling aprons each running over one pair of bottom rolls and one top roll, as set forth.

3. The combination, with the wheels of a vehicle having gears S S upon them, and a shaft U, having gears G G, and clutches W W, provided with springs X X, and a gear L upon it, of the gear V, meshing in gear Z, yoke H, and bracket U, supporting-gear V, couplings I I, shaft J M, leading from gear V to forward end of vehicle, shaft O, operating from shaft M, and shaft P, operated from shaft O, and rolls for the canvas operated from shaft P, as set forth.

In testimony whereof I affix my signature in presence of two witnesses.

JAMES ANDREW CHRISTY.

Witnesses:
HALLAND SMITH,
LUTHER B. COLEMAN.